United States Patent [19]

Rilett

[11] 4,449,372
[45] May 22, 1984

[54] GAS POWERED MOTORS

[76] Inventor: John W. Rilett, The Gables, Hawkers Hill, Bibury, Gloucestershire, England

[21] Appl. No.: 341,881

[22] Filed: Jan. 22, 1982

Related U.S. Application Data

[62] Division of Ser. No. 72,561, Sep. 4, 1979, Pat. No. 4,327,533.

[30] Foreign Application Priority Data

Sep. 5, 1978 [GB] United Kingdom ............... 35603/78

[51] Int. Cl.³ ............................................. F01K 25/10
[52] U.S. Cl. ........................................ 60/671; 60/673
[58] Field of Search ................. 60/671, 673, 649, 651; 62/50

[56] References Cited

U.S. PATENT DOCUMENTS

| | | | |
|---|---|---|---|
| 3,872,672 | 3/1975 | Rein | 60/649 |
| 4,092,830 | 6/1978 | Rilett | 60/671 |
| 4,195,485 | 4/1980 | Brinkerhoff | 60/673 |
| 4,224,799 | 9/1980 | Rilett | 60/671 |

Primary Examiner—A. Michael Chambers
Attorney, Agent, or Firm—Kenyon & Kenyon

[57] ABSTRACT

The gas powered vehicle has a reservoir for holding liquified gas, means to evaporate the liquified gas and a delivery conduit to deliver gas from the evaporating means to a motor to power the motor. A heat exchanger is provided for thermal communication between a condensing buffer substance and the expanded gas flowing into the receiving means. A refrigeration means pumps heat from and cools the condensing substance to a temperature low enough to condense the expanded gas received from the motor.

36 Claims, 2 Drawing Figures

GAS POWERED MOTORS

This is a division of application Ser. No. 72,561 filed Sept. 4, 1979 now U.S. Pat. No. 4,327,533.

BACKGROUND OF THE INVENTION

1. Field of the Invention

The present invention is concerned with gas-operated motors and gas-supply apparatus therefor. In particular the invention relates to motors for which the working fluid is a non-burning gas which is condensible at familiar climatic temperatures under the action of pressure alone, for example carbon dioxide, water vapour, halocarbons such as the FREONS (Registered Trade Mark) and the like. An aim of the present invention is to provide means to use such gas-operated motors at much higher power levels than was practicable heretofore and, in particular to provide means to achieve a substantially improved economy of gas and energy usage.

2. Description of the Prior Art

Motors adapted to run on a supply of carbon dioxide are already well known. Usual versions of such motors employ a simple tank as a reservoir to contain a mixture of gaseous and liquid carbon dioxide under pressure from which the gas boils off to supply the motor during operation. This process causes the tank and the gas-liquid mixture within it to become rapidly colder, with a consequent and undesirable rapid fall in pressure of the gas in the tank causing falling motor power.

Methods and apparatus which overcome this problem are described in U.S. Pat. No. 4,092,830 which proposes the provision of one or more container(s) holding or capable of being charged with buffer substance(s) in heat-conductive relationship with the reservoir or with a passage through which, in operation, the gas is supplied from the reservoir to the motor. By the term 'buffer substance' is meant a substance which undergoes a clange in its physical, chemical, crystallographic or other state at a temperature above the final operating temperature of the gas, the said change of state causing a release of heat to the gas or liquified gas. The choice and effects of suitable buffer substances are discussed in U.S. Pat. No. 4,092,830, the disclosure of which is incorporated herein by reference.

SUMMARY OF THE INVENTION

Briefly, the invention provides a gas powered motor having means for holding liquidified gas; means for evaporating the liquified gas, conduit means to deliver gas from the evaporating means to a motor to power the motor, receiving means for expanded gas from the motor, condensing buffer substance means (as hereinafter defined) in thermal communication with the expanded gas flowing into the receiving means, and refrigeration means to pump heat from and cool the condensing buffer substance means to a temperature low enough to condense the expanded gas.

The term condensing buffer substance as used throughout the specification is intended to mean a substance which undergoes a change other than a change from liquid to vapor in its physical, chemical or crystallographic state, or adsorptive, persorptive or other associative state the said change of state occurring as the said working fluid condenses by liquefaction, adsorption, persorption or association etc.

The invention is hereinafter described in terms of its application to engines for powering fairly high-performance cars although the invention may be used in engines which are equally useful in many other applications, e.g. for powering other automotive devices such as fork lift trucks, boats and trains.

In the embodiments described in U.S. Pat. No. 4,092,830 the temperature of the gas leaving the gas-supply apparatus (hereinafter referred to as a "power capsule") could be no higher than that of the buffer substance(s) in the power capsule. Present power capsules employ a buffer substance which remelts by heat flow from its surroundings which may in cold weather by typically at 5° C. Clearly the buffer substance should have a freezing point below 5° C. so that it may remelt automatically; but such a low freezing point limits the power-economy of motors supplied by such power capsules to about 65 joules per gram in the case of a carbon dioxide working fluid which, though much higher than the circa 40J/gm obtained from motors with un-buffered tanks, is still inadequate for high-powered motors where the weight and cost of $CO_2$ or other working fluid may become prohibitive.

Firstly, from the foregoing it will be seen that in order to realise the full potential of gas-operated motors of this type, there is a need to provide heat energy which is not necessarily linked to the ambient climatic temperature (because of the need to choose the buffer substance's freezing point so as to be just below that ambient temperature). The present invention achieves this object by using materials hereinafter referred to as reactive "heat source materials".

Secondly, the present invention proposes means to condense the gas exhausted from the motor so as greatly to reduce the volume occupied by such exhausted gas and to provide means to collect it for subsequent re-use. The means to condense the gas in the present invention is given the generic name "condensing buffer substance" because the process of condensation is brought about by transferring the latent heat of vaporization of the condensing gas *to* the condensing buffer substance which is the reverse of the similar process in the power capsule supplying the motor whereby the latent heat of vaporization of the evaporating gas is transferred *from* a buffer substance. The condensing buffer substance may extract the latent heat of vaporization of the condensing gas by taking in its own latent heat of fusion in which case the process of condensation will be substantially isothermal; other condensing buffer substances may extract and immediately release the latent heat of vaporization of the condensing gas and so exhibit a rise in temperature in which case the released heat may usefully be employed elsewhere e.g. to superheat the gas being supplied to the motor: in this latter case the condensing buffer substance in effect performs the two functions of a heat source material and a means of condensing the gas.

Thirdly, the present invention proposes means to recycle the gas back to the power capsule in such a way as to restore the condensing buffer substance to its original state i.e. to extract heat from the condensing buffer substance and transfer it as heat of vapourisation to the gas being recycled. Again this reversed process may be substantially isothermal if the condensing buffer substance is chosen to employ e.g. its latent heat of fusion; other condensing substances may exhibit a fall in temperature during the recycling process in which case they may perform other useful functions e.g. to cool and condense the recycled gas. In any event the recycling process is a heat pumping process.

Finally the present invention proposes means to perform ancillary functions such as power-steering of a man-carrying lawnmower or other vehicle, load-lifting on a fork-lift truck, refrigeration in lorries or trains, etc. etc.

These proposals will now be described in more detail.

GENERAL SCHEME

In general, the use of a buffered tank to supply the motor with gas (i.e. a power capsule) is to be preferred as this ensures the supply of gas at a sensibly constant pressure which not only allows the thermodynamic efficiency of the motor to be optimised but also helps to stabilise the torque of the motor. Furthermore, the use of a buffer around the tank is a very cheap and simply way to provide the heat energy necessary to evaporate the working fluid.

Secondly, the present invention proposes that the power capsule buffering temperature should now be chosen typically in the range $-10°$ C. to $+10°$ C., for outdoor use. Thus the use of water (freezing point $0°$ C.) with its high latent heat, high heat conductivity and extreme cheapness may provide an ideal choice of buffer for all power capsules for lawn mowers.

Nevertheless the present invention does allow the use of other buffering temperatures: for example a buffering temperature of $+12°$ C. may prove to be more satisfactory for appliances used indoors whereas a buffering temperature of $-25°$ C. may be chosen for forklift trucks to be used in cold stores, etc.

Thirdly, the present invention proposes the use of a superheater to heat the gas to a temperature above that of the power capsule buffer's freezing point by the employment of reactive heat source materials in which the heat of physico-chemical reaction is at a significant level. However the present invention suggests that this superheater should normally be limited to a working fluid superheating temperature of about $200°$ C. in the case of using present-day plastics materials, and to about $300°$ C. in the case of using emergent plastics materials for the engine components.

The present invention proposes that the aforesaid reactive heat source materials should preferably be chosen to allow reversible chemical or physico-chemical reactions which are reversible by the application of heat and/or reduced pressure.

One such reactive heat source material is calcium oxide $CaO$ which can be made to associate with $CO_2$ (or with $H_2O$ in the hereinafter described embodiment of the present invention) under pressure so as to release heat, and to dissociate therefrom by the application of heat and reduced pressure, thereby providing the desired reaction reversability.

The amount of $CO_2$ (or $H_2O$) which associates in equilibrium with calcium oxide is dependent on the temperature and pressure of the $CO_2$ (or $H_2O$). In the case of calcium oxide $CaO$ the amount of heat released in this association—of $CO_2$ and calcium oxide to give calcium carbonate $CaCO_3$, or of $H_2O$ and calcium oxide to give calcium hydroxide $Ca(OH)_2$— is very much greater than in the case of the best persorbers. For example at atmospheric pressure the association of $CO_2$ with $CaO$ to give calcium carbonate is quoted as releasing about 2900 joules per gram of $CaO$— and at a temperature of $900°$ C. At higher pressures, for instance at approximately 30 atmospheres which may exist in an active superheater supplied by a water-buffered power capsule, the released heat would be slightly lower but would be available at considerably higher temperatures (than $900°$ C.) if so desired. Generally one can expect to obtain at least 2400 J/gm of $CaO$ when reacted with $CO_2$.

Alternatively the $CaO$ may associate with $H_2O$ to give $Ca(OH)_2$ in which case the heat released at atmospheric and higher pressure will be in the region of 1800 J/gm of $CaO$. Although less than the 2400 J/gm (at least) available from the $CO_2$ reaction, this 1800 J/gm is nevertheless adequate in many of the high-power applications of the present invention. Generally the $H_2O$ reaction may be preferred firstly because it can be initiated at ambient temperature (especially under pressure) whereas the $CO_2$ reaction requires preheating before it will start, secondly because the $Ca(OH)_2$ can be dissociated (or "regenerated" to $CaO$) at lower temperatures and with less vacuum or at higher gauge pressures than $CaCO_3$ can, and thirdly because $H_2O$ is in many ways more convenient and less expensive than $CO_2$.

It is stressed that, whether $CO_2$ or $H_2O$ is used in the present invention, it can as desired be used either as the working fluid as well as the reversible reactant with $CaO$, or alternatively only as the reversible reactant so as to provide heat for the heating of another working fluid such as one of the halocarbons or the like. Also it is emphasized that, although both the $CO_2$ and the $H_2O$ reaction with $CaO$ will provide heat at temperatures of at least $900°$ C. and $400°$ C. respectively, the present invention proposes that it is preferable to use this reaction heat to heat the working fluid to only $200°$ C. or $300°$ C. or so, in order that the motor may largely be made of existing or emergent plastic materials, with the exception perhaps of the motor's working chamber wall which may preferably be of metal if required to conduct heat from the reaction to the expanding gas within the working chamber. Such limitation of the working fluid temperature to $200°$ C. or $300°$ C. or so has the added advantage of providing a large mean temperature difference between the working fluid and the reaction, which encourages heat flow and so reduces the heat transfer area necessary.

The present invention is not limited to the use of $CaO$ alone as a material which provides a reversible physico-chemical reaction with $CO_2$ or $H_2O$ and the following alternatives may also be used:

(a) Lithium Oxide $Li_2O$.
(b) Sodium monoxide $Na_2O$.
(c) Sodium peroxide $Na_2O_2$—which gives an easily reversible reaction with water especially—though the product $NaOH$ (sodium hydroxide or "Caustic Soda") is extremely corrosive.
(d) Potassium monoxide $K_2O$.
(e) Potassium dioxide $K_2O_2$.
(f) Potassium peroxide $KO_2$.
(g) Magnesium oxide $MgO$.
(h) Calcium peroxide $CaO_2$.
(j) Calcium tetroxide $CaO_4$.
(k) Strontium Oxide $SrO$.
(l) Strontium peroxide $SrO_2$.
(m) Barium Oxide $BaO$, which is especially energetic with either $H_2O$ or $CO_2$, but, after reaction with $CO_2$ to give the carbonate $BaCO_3$, can be regenerated by heating with carbon—through this produces the toxic gas carbon monoxide $CO$.
(n) Barium Peroxide $BaO_2$, which also has a particularly easily reversible reaction with oxygen, giving much heat.

The above list is not exhaustive and many other reversible reactions may be used, either where they react with a proportion of the working fluid, or where they react with another substance so as to provide heat for the working fluid.

In U.S. Pat. No. 4,224,799 it was proposed that the working fluid of a gas-operated motor according to that invention should, after expansion in the working chamber(s) of the motor, be exhausted to a sealed exhaust chamber from which it could be returned to the power capsule (which supplied the said motor with gas) following operation of the said motor. The present invention extends the technique so described in U.S. Pat. No. 4,224,799 by using methods and apparatus which will now be described.

Firstly the present invention proposes that a condensing buffer substance (as hereinbefore described) should be utilised so as to provide a heat sink in heat-conductive relationship with the exhaust passage and/or exhaust chamber to which the working fluid is exhausted after expansion in the working chamber(s) of the motor. The function of the said heat sink is to condense the said exhausted working fluid at the relatively low pressure of the exhausted working fluid, primarily so as to reduce the volume necessary for the containment of the exhausted working fluid and secondly so as to allow any liquid working fluid resulting from such condensation to be pumped back to the power capsule with little consumption of power.

To these ends the present invention proposes that such a heat sink may comprise a suitable quantity of condensing buffer substance which is able to condense the exhausted working fluid by process of liquefaction, adsorption, persorption, association or by other suchlike processes. Dealing first with processes for liquefaction, the present invention proposes for example the use of a condensing buffer substance which has a freezing point, boiling point or other temperature at which a change in its physical, chemical, crystallographic or other stage takes place, this said change of state occurring as the working fluid condenses by liquefaction. Thus for example, the condensing buffer substance may comprise a solution of e.g. 29% by weight of calcium chloride $CaCl_2$ in water which has a freezing point of $-55°$ C. approximately, advantageously encapsulated in small (e.g. 20 mm diameter) spherical or cylindrical capsules or plastics or other suitable material (e.g. of metal in embodiments wherein rapid liquefaction is vitally important). A large number of such capsules may then be loaded, it is proposed, into the exhaust chamber and/or the exhaust passage to which the exhausted working fluid is led after expansion, and cooled by refrigeration or other means before use of the vehicle or other embodiment so as preferably to bring about the freezing of the said condensing buffer substance. Other condensing buffer substances required to perform such liquefaction (which may be complete or partial) include ethylene glycol (known commonly as "antifreeze" and usually diluted with water so as to control its freezing point), ethyl alcohol, glycerine, sodium chloride (these last three also often dissolved in or mixed with water so as to achieve a desired freezing point) and very many others. The condensing buffer substance may also comprise several substances together, as for example the solution of both calcium chloride $CaCl$ and sodium chloride $NaCl$ in water. Finally another condensing buffer substance of particular interest is solid $CO_2$ with a freezing point of $-56.6°$ C. (at 5.2 atmospheres) and a particularly high latent heat of sublimation.

Dealing secondly with condensation of the exhausted working fluid by processes of adsorption, persorption, association and the like, the present invention proposes that, in some of its embodiments it may be preferable to employ suchlike processes rather than liquefaction in order to bring about the desired condensation of the exhausted working fluid or in order to employ the exhausted working fluid for other purposes. Thus, for example in a lawn mower motor using $CO_2$ as a working fluid, the exhausted $CO_2$ may be led to a chamber containing material of e.g. the adsorptive, persorptive or associative (reversible physico-chemical) type, the said chamber being in heat-conductive relationship with for example the passage supplying $CO_2$ gas to the motor and/or the working chamber(s) of the motor, in order that the heat of adsorption, persorption or association as the case may be can be employed so as to superheat the working fluid and so increase the economy of gas usage and/or the power of the motor, as described in U.S. Pat. No. 4,327,553.

Returning however to embodiments of the present invention in which a colder-than-ambient heat sink together with a heat pump or refrigerator is desirable so as to condense the exhausted working fluid by liquefaction for example trucks in which the presence of a quite large quantity of condensing buffer substance at perhaps $-30°$ C. or so may have secondary value as a means to refrigerate the truck and its cargo (for instance deep-frozen meat) the present invention proposes that one or more best pump(s) or refrigerator(s)-hereinafter referred to, for convenience, as the "heat pump" should be provided so as to pump heat from the said condensing buffer substance and to one or more buffer substances at one or more higher temperatures. This proposal leads to several important advantages, described as follows.

Firstly, when a halocarbon for instance is employed as the working fluid of the heat pump, for each unit of mechanical energy provided to the compressor of the heat pump, approximately four units of heat energy are transferred from the heat sink to the heat source (that is, in the present invention, from the heat sink constituted by the condensing buffer substance to the heat source(s) constituted by one or more buffer substances at one or more higher temperature(s)). Therefore, if for example a truck according to the present invention employs a polyethylene glycol with say a 35° C. freezing point as the buffer substance providing latent heat to boil the working fluid, and a calcium chloride solution in water with say a $-30°$ C. freezing point as the condensing buffer substance which condenses the working fluid by liquefaction, then 1 MJ of mechanical energy supplied to the compressor of the heat pump may provide about 4 MJ of heat for boiling (via the 35° C. buffer) as well as 4 MJ or cooling capacity for liquefaction (via the $-30°$ C. condensing buffer). Clearly this is very energy-efficient, especially as with suitable design almost all of the 1 MJ supplied to the heat pump of the truck will later appear as useful motive energy at the wheels. This aspect of the present invention therefore allows energy to be stored and later converted to useful motive energy.

Secondly, the present invention also proposes that the said heat pump compressor may in some such embodiments be the self-same motor which drives the truck, vehicle of other artefact embodying the present invention, if the said motor is designed to be operable in reversed mode as a compressor as was disclosed in U.S. Pat. No. 4,224,799 and which is incorporated herein by reference.

Thirdly, the provision of a heat pump as proposed in the present invention permits the quantity of condensing and other buffer substance(s) necessary for a long journey or period of use to be reduced very substantially.

A further disclosure according to the present invention is that the working fluid may be used to perform a variety of valuable ancillary functions.

For example in a forklift truck the said gas may be used to lift and lower the fork and other devices using known types of pneumatic cylinder.

For example in a train or other passenger-carrying vehicle the exhaust gas from the motor, and the heat sink comprised by the condensing buffer substance being normally below ambient temperature, may be employed in known heat-transfer devices so as to provide cool air to the passengers; to provide cooling or refrigeration or deep-freezing for drinks, foods or perishable goods respectively; etc.

For example in a private car or goods-carrying vehicle, the said gas may be employed in known pneumatic devices so as to raise and lower the windows, the trunk-lid, the hood, the hatch-back (if any), a tailboard, a platform for loading and unloading heavy goods, the seats, the car or other vehicle itself (so as to jack it up for wheel-changing or other repairs and servicing); to open and close the doors, sunroof, convertible top, etc; to raise and lower any radio aerial; to power-assist the steering; to drive the windshield wipers; to expel cleaning fluid for the windshield washers, headlamp washers, rear window washer or even for whole-car washers; to inflate the tires, in particular within a fraction of a second of a puncture by means of a pressure sensor within each tire; to adjust the tire pressures to the load carried and/or to the desired rolling resistance in consideration of the road surface, speed and range of the car or other vehicle; to adjust the suspension height and degree of shock-absorption and suspension spring-rate in consideration of the load carried, the road surface, etc; to provide transient and other anti-roll, anti-pitch and similar suspension corrections when for example cornering, braking and accelerating; to drive air-circulating and ventilation devices; to inflate crash-impacting fenders and other devices to lessen the risk of personal injury and vehicle damage in collisions and other accidents; to provide an immediate envelope of cool, non-inflammable gas in the event of fire; to blow the horn; to extinguish cigarette and cigar ends; to adjust the headlamps (in particular in a lateral sense when negotiating bends); to draw curtains and to raise and lower blinds; etc.etc.

The above examples are not exhaustive and numerous other services may be performed by means of the sources of gas at various temperatures and pressures within embodiments of the present invention and by means of the types of material and the buffer substances provided by the present invention which therefore claims priority of use only for services as disclosed in the examples given herein and for suchlike services which depend upon the said sources of gas and/or the said types of material and/or the said buffer substances and/or the other components disclosed herein to be part of embodiments of the present invention.

Pressures mentioned in the following description are gauge pressures in pounds per square inch, abbreviated to "psig".

Figure 1:
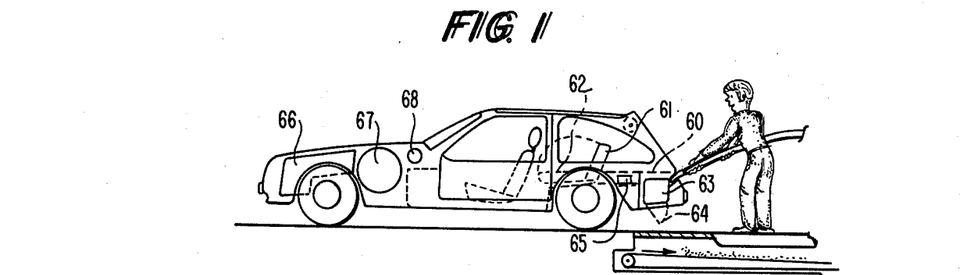
FIG. 1 illustrates an elevational view of a car employing an apparatus according to the invention.

Referring to FIG. 1, this shows a family car of the "hatchback" type, able to carry two people plus goods or luggage on the rear platform 60 when the rear seat backrests 61 are folded forward to the position shown by the dashed outline 62. The car is a fairly high performance car shown at approximately one fiftieth full size and is adapted to be quickly recharged by electricity alone when used from the home or office for commuting, shopping and local trips up to about 150 miles range. However, the car may proceed one longer journeys of 200-300 miles at relatively high speed after refilling at a service station or even at one's home. The car may automatically become recharged to the 150 mile range at the end of the longer journey. Alternatively, four or five people may be carried plus a smaller quantity of goods or luggage, when the rear seat backrests are upright.

The car is shown being refilled with fuel (5 gallons water plus 50 kg of calcium granules) at a service station, in preparation for a non-stop journey of about 200 miles at a cruising speed of about 70 mph.

Also during refilling it is necessary to empty the products of reaction from previous car usage. These products of reaction are mainly comprised of calcium hydroxide Ca(OH)$_2$, known as slaked lime, with a small admixture of calcium sulphate which may be the anhydrite CaSO$_4$ possibly containing some of the hemihydrate CaSO$_4$.$\frac{1}{2}$H$_2$O (known as Plaster of Paris) and some of the dihydrate CoSO$_4$.2H$_2$O, known as gypsum, together with a little ash residue from combustion of the protective coating on the original calcium granules. Being brittle, friable and fairly harmless (as they are almost identical to powdered concrete with no aggregate) the said products of reaction may be emptied from the reaction chamber 63 by opening the lower flap 64 and allowing them to fall into any suitable container perhaps with the assistance if a vibrator fixed to the reaction chamber wall.

As shown in FIG. 1, the electric-charging cable is carried on a cable drum 65 which may be one of several known types, though advantageously provided with a spring-returned cable and plug of at least 60 amp capacity at 240 volts and preferably, it later models designed for recharging in less than an hour, at least double this current capacity.

Under the bonnet of the car in FIG. 1 are installed firstly a heat sink 66 which essentially comprises a conventional metal tank holding within it numerous containers of a condensing buffer substance which may for instance be a 29% solution of calcium chloride in water, which has a freezing point of about −55° C.; secondly a heat source 67 constituted by a cylindrical (for example) vessel containing a buffer substance which may for example be polyethylene glycol of molecular weight 10,000 or above and thirdly an intermediate store 68 which comprises a smaller cylindrical (for example) tank containing a buffer substance.

Figure 2:
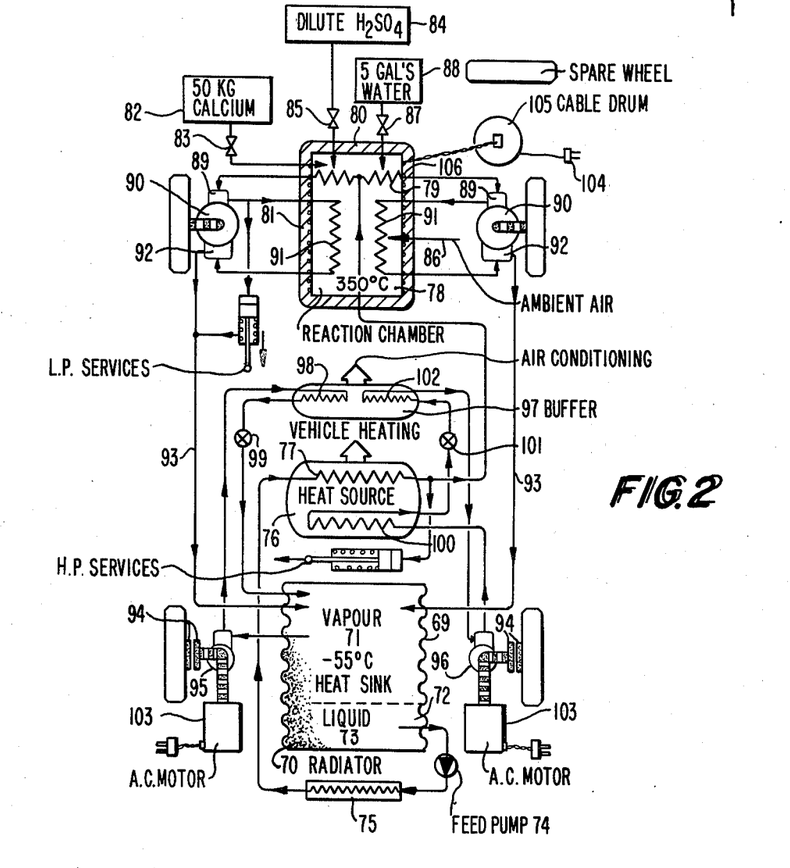
FIG. 2 illustrates a schematic view of the main working components of the car of FIG. 1 in accordance with the invention.

Turning to FIG. 2 the car's energy system will now be described. As indicated, the car is illustrated at approximately one thirtieth full size with most of the main working components shown in horizontal cross-section with others indicated in symbolic form (e.g. pipes, valves, heat exchangers, feed pump, compressors and rotary transmission links). Most of the components are separated from each other in the manner of an "exploded" illustration for the sake of clarity. An exhaust chamber 69 of approximately 0.3 cubic meter capacity contains about 250 kg of a 29% solution of calcium chloride in water encapsulated in numerous plastic spheres of about 20 mm diameter in order to constitute a heat sink 70 for condensation of the working fluid which in this embodiment may enter the exhaust chamber as R 502 vapour 71.

However there may be some disadvantage in using R 502 at the superheating temperature proposed in this embodiment (which might cause some decomposition of the R 502) and so the following alternatives may be preferable:

| Working fluid | Chemical Formula | Boiling Point @ 1 atmos. |
|---|---|---|
| Halocarbon R 12 | $CCl_2F_2$ | $-29.8°$ C. |
| Halocarbon R 13 | $CClF_3$ | $-81.4°$ C. |
| Halocarbon R 13B1 | $CBrF_3$ | $-57.75°$ C. |
| Halocarbon R 23 | $CHF_3$ | $-82.03°$ C. |
| Halocarbon R 115 | $C_2ClF_5$ | $-38.7°$ C. |
| Halocarbon R 116 | $C_2F_6$ | $-78.2°$ C. |
| Halocarbon R 500 | Azeotrope of $CCl_2F_2$ & $C_2H_4F_2$ | $-33.5°$ C. |

Of the above, the halocarbons R 12, R 115 and R 500 may be preferable because they can be easily condensed at low gauge pressures and at temperatures in the region of $31\frac{1}{2}°$ C., $31 38°$ C. and $-33°$ C. respectively, which may be more attractive than the about $-45°$ C. required for Halocarbon R 502 because the heat transfer surface area of the heat sink may thereby be reduced, or the freezing point of the condensing buffer substance (i.e. the calcium chloride solution for example) increased so as to reduce the insulation required around the exhaust chamber (not shown in FIG. 2). Alternatively the exhaust chamber may be designed to withstand much higher gauge pressures in which case the lower boiling point working fluids may be used, giving an increase in cycle efficiency. In another case the use of CO2 as a working fluid provides an interesting alternative because, if the exhaust chamber temperature is held below $-56.6°$ C., solid CO2 will form at exhaust chamber pressures below about 60 psig: such solid CO2—frequently known as "dry ice"—has a very high latent heat of vapourisation of 562 joules per gram at 0 psig and so can serve as the condensing buffer substance of the heat sink as well as the working fluid, dispensing with the need for the encapsulated calcium chloride solution or other condensing buffer substance.

However the above is not an exhaustive list of the working fluids which may be used in the present embodiment; they may be chosen from a very large number of alternatives and those given above are only mentioned because they have desirable properties such as non-inflammability, non-toxicity, cheapness and ready availability. It is entirely possible to employ alternative working fluids having for instance a boiling point considerably higher than those given above: for instance halocarbons R 21, R 114, R 114B2 which have normal boiling points of $8.92°$ C., $3.77°$ C. and $47.26°$C. respectively; but such relatively high boiling points are not in general to be preferred firstly because the pressure after boiling may be undesirably low unless boiling is done at rather a high temperature, secondly because the opportunity to employ heat from the ambient air is reduced, and thirdly because the overall cycle's energy economy may be somewhat impaired.

The forward part of the exhaust chamber is stepped down to form a well 72 in which condensed liquid working fluid 73 may collect. This liquid is pumped by a small feed pump 74 to a radiator 75 through which ambient air passes due to the forward motion of the car or with the assistance of a fan (not shown, being of known types.) This increases the liquid working fluid temperature to the region of $-5°$ C. (more in warm weather) and may cause condensation of atmospheric water vapour into water or even ice: such condensation may be used to advantage firstly as a means of collecting the free heat of condensation of water vapour in the ambient air so as to increase the cycle efficiency or to reduce the size of the radiator, secondly to reduce the size of the subsequent heat source used for boiling, and thirdly to collect water during motion if so desired for replenishment of the water needed for reaction or humidification etc.

Thence the liquid is piped to the heat source 76 which in this embodiment comprises approximately 180 kg of polyethylene glycol buffer, held in a cylindrical or other suitably-shaped power capsule. There the liquid working fluid is boiled as it passes through a coiled pipe 77 or other known type of heat-exchanging means. The heat source is also used to supply vehicle heating as shown in FIG. 4. The coiled pipe 77 contains anti-bumping material.

Next the vapour is piped to the reaction chamber 78 where it is superheated by further coiled pipes forming one or more superheaters 79. The reaction chamber is constituted by a metallic vessel 80 provided with insulation 81 to prevent heat loss and which advantageously may comprise a material of exeptionally high insulating qualities such as MICROPORE (Registered Trade Mark).

To the reaction vessel are metered calcium granules, advantageously of a size smaller than rice grains and coated with lacquer or plastic to present slow attack by atmospheric water vapour, contained within the calcium tank 82 and metered by means of the valve 83.

At the beginning of a long journey the H2SO4 bottle 84 containing about 2 pints of dilute H2SO4 is partly drained through the valve 85 into the reaction vessel so as to raise the reaction temperature quickly with the energetic first-stage reaction:

$$Ca + H_2SO_4 + 2H_2O = CaSO_4.2H_2O$$
$$(\text{"gypsum"}) + H_2$$

Simultaneously ambient air 86 is admitted to the reaction vessel so as to burn the hydrogen from the stage one reaction, this comprising the stage two reaction and providing further heat energy as well as hot nitrogen which advantageously is piped away from the reaction vessel and through a coiled pipe (not shown) in the heat source 76 so as to be cooled before exhaust to atmosphere.

Thereafter water is metered via the valve 87 from the water tank 88 preferably to the base of the reaction vessel, whilst further calcium granules are metered in about it. The purpose of this arrangement is to permit "fluidised bed" reaction between the calcium granules and the steam produced at the water boils underneath, because fluidised bed reaction is particularly efficient, provides very high heat transfer rates, and also promotes the formation of a friable, powdered "ash" of calcium hydroxide in the stage three reaction:

$$Ca + 2H_2O = Ca(OH)_2 + H_2$$

Again the hydrogen so produced is burnt in admitted ambient air and the nitrogen so heated is cooled in the heat source 76 and then exhausted.

During these latter two reactions the gypsum from the stage one reaction is dehydrated progressively, first to the hemi-hydrate $CaSO_4.\frac{1}{2}H_2O$ (known as Plaster of Paris) and then to the anhydrite $CaSO_4$: both of these dehydrations cause shrinkage of the original gypsum and help to maintain the calcium hydroxide in a granulated, porous, friable and brittle mass, thereby to assist reaction and the ultimate easy discharge of the calcium hydroxide from the reaction vessel through its lower flap (not shown in FIG. 2 but shown in FIG. 1, reference numeral 64) before the next refueling for a long journey.

The superheated working fluid is first admitted to the high pressure ("H.P.") cylinders 89 of each of two engines 90. Each such engine may typically have four cylinders (two H.P. and two low-pressure or "L.P.") and a swept volume in the region of one liter so as to be able to produce a shaft output at maximum rated speed of approximately 50 b.h.p.

It should be added that the present embodiment does not propose the use of buffered cylinder walls as disclosed in U.K. Pat. No. 2,007,313 or of cylinder wall heating, in the interests of manufacturing economy and light weight. Instead, and in order to increase cycle efficiency rather than economy of gas usage (which is not so important in a continuously-recycling system such as this), the working fluid, upon exhaust from the H.P. cylinders is led back to reheaters 91 in the reaction vessel, and then admitted to the L.P. cylinders 92 of the two engines; here it is expanded and led by the exhaust passages 93 back to the exhaust chamber for condensation.

The above-described recirculation system would, it is emphasized, work without any further elaboration in vehicles of up to about 80 MJ of stored motive energy i.e. about 30 b.h.p.-hours. However, though sufficient for say an invalid car or forklift truck, 80 MJ will take a medium-performance family car only about 50 miles at 75 mph. To increase this high-speed range to 250 miles requires approximately 400 MJ (150 b.h.p.-hours) and, if the energy system were left as described so far, would require the exhaust chamber to be increased to about 1.5 cubic meters and 1500 kg weight, and the heat source to be increased to about 2 cubic meters and 2000 kg weight. This would imply a car of the size of a VW "Caravette" weighing about $4\frac{1}{2}$ tonnes, with too much air-resistance to achieve more than about 125 miles at 75 mph, and therefore requiring double the energy cost per mile of the present embodiment.

To overcome this problem and achieve a primary object of the invention, the front wheels of the car may be linked by the clutch-brakes 94 to two small compressors 95 and 96 upon a signal from the driver for example by the brake pedal which, with increasing foot pressure, progressively increases the compressive flow capacity of both compressors. The compressor 95 takes suction of the main working fluid from the vapour space in the exhaust chamber and compresses it in gaseous form. This "hot" gas is piped to the intermediate store 97 (containing perhaps 30 kg of a buffer substance having a freezing point of between say 0° C. and 100° C. and passed through a condenser 98 which cools and condenses the gas.

This high-pressure liquid working fluid is then expanded by the pressure-reducing valve 99 in the known manner of domestic refrigerators so as to produce a very cold wet vapour which is returned to the exhaust chamber. By this means 1 MJ of energy taken from the offside front wheel for example may pump about 4 MJ of heat out of the heat sink so as to keep it completely or partly frozen at say −55° C.; at the same time about 4 MJ of heat will be pumped into the intermediate store 97 in the known manner of a heat pump.

Similarly the compressor 96 takes suction of a working fluid (which may be the same as the main working fluid or which may advantageously be another working fluid such as ammonia $NH_3$, halocarbon R 12 or other fluid suitable for pumping heat) and, compresses it using the energy from the other front wheel to a gas at high pressure. This hot gas is piped to the heat source 76 where it condenses to a high-pressure liquid in the condenser 100. Then it is expanded by the pressure-reducing valve 101 to produce a cold wet vapour which is led through the evaporator 102 (which advantageously may contain some anti-bumping material such as fused alumina) in the intermediate store 97, where it is more completely evaporated to provide the gaseous suction for the compressor 96. By this means 1 MJ of energy taken from the nearside front wheel for example may pump the 4 MJ of heat which was heat-pumped to the intermediate store 97 by the other compressor 95 and at the same time deliver about 4 MJ of heat to the heat source 76.

This elaboration of the system by use of the two said compressors provides some quite dramatic advantages, as follows.

Firstly, a one tonne vehicle travelling at 60 mph has about 0.36 MJ of kinetic energy, of which 0.3 MJ is available at the brakes every time the vehicle is braked to say 25 mph. Studies suggest that in typical car usage on major and minor roads (not motorways) such braking may be needed at least ten times per hour so, in a three-hour journey, 30×0.3=9 MJ of kinetic energy may be used to pump 4×9 MJ=36 MJ of heat.

Secondly, a one tonne vehicle coming down a hill 100 meters high will release about 0.98 MJ, of which perhaps 0.8 MJ may be available at the brakes. Again studies suggest that in road journeys in Britain and probably in most other countries—but not on most motorways—downhill slopes may allow again typically about 9 MJ of such potential energy to be recovered at the clutch-brakes 94 of the present embodiment. Again this may be used to pump about 4×9 MJ=36 MJ of heat. These two lots of 36 MJ allow the heat sink to be lightened by about 120 kg and the heat source to be lightened by about 200 kg below their respective masses which would be needed without such regenerative braking.

On motorways however, regenerative braking is unlikely to provide enough pumped heat to allow the heat sink and source to be reduced to desirably small sizes and weights, because of their absence of traffic lights, roundabouts and traffic jams—and of steep downgrades—which would require application of the clutch-brakes of the present embodiment.

Therefore the present embodiment allows the clutch-brakes 94 to be applied—by a signal from the driver in much the same circumstances and manner as he would switch into 'overdrive'—whenever cruising speed has been reached and further acceleration is not normally required, though the driver can of course switch back to direct drive so as to achieve high acceleration for overtaking, etc., etc., at a moment's notice, either by switching out the 'overdrive' or by a "kickdown" action on the accelerator pedal.

In overdrive however, acceleration is naturally lower, with the clutch-brakes applied and the compressors set to a part-load setting. This has the effect of causing a less rapid pumping of heat than in the case of braking but—because it may continue for quite long cruising periods—may pump very considerable quantities of heat from the heat sink to the heat source. Thus, for example if 30 b.h.p. is redirected in this way for perhaps one hour of cruising, then 160 MJ of heat may be pumped from the heat sink and to the heat source.

Also shown in FIG. 2 are the two A.C. Motors 103 coupled to the compressors by rotary transmission links. These A.C. Motors have two primary functions: firstly part or all of the windings of one or both of them—which may be of the same type as in present-day alternators as used in cars—may be used to supply electricity generated during motion of the car (when the clutch-brakes are applied) to a car battery as in present-day cars, so as to provide a source of electricity for lights, headlamps, radio, stereo and any other services not operable by gas pressure; secondly during recharging of the car by electricity the A.C. Motors are connected to a mains electric power point and, with the clutch-brakes disengaged, used to drive the two compressors so as to freeze the condensing buffer substance of the heat sink and to melt the buffer substance of the heat source.

At the end of a long journey of say 250 miles at 75 mph when all of the calcium has been converted into calcium hydroxide ("slaked lime") with a little calcium sulphate content, the car may then be used as a short range vehicle of say 150 mile range at about 45 mph average, by recharging with electricity at home or office etc. without the need to visit e.g. a service station for further "fuel", and at extremely low energy cost. This is done, advantageously at the same time as driving the A.C. Motors as described above and perhaps with the same electric plug 104 on a long charging cable stored on the cable drum 105 by means of the electric heater 106 which in this embodiment is installed on the outer surface of the reaction vessel so as to be in good thermal contact with it but thermally insulated against heat loss to the environment by the insulation 81.

The said electric heater is used to dissociate and drive off water from the calcium hydroxide by heating the latter to 500°-600° C., converting it thereby to calcium oxide CaO, otherwise known commonly as "quicklime". The electrical energy necessary to accomplish this in the present embodiment will be approximately 50 kw-hr. About a further 10 kw-hr will be required to drive the two A.C. Motors during recharging, giving a total recharging requirement of about 60 kw-hr.

The steam driven off during recharging may be collected and condensed within the water tank 88 so as to avoid the need to refill the water tank with 5 gallons of water prior to subsequent usage: minor topping-up may be all that is then required.

In the short-range mode the present embodiment, after recharging, will have 70 kg of quicklime in the reaction vessel and 22.5 kg (5 gallons) of water in the water tank, the latter being fed back to the base of the reaction vessel via the valve 87 during driving, being metered by control devices in the same way as for long-range operation as previously disclosed. The consequent slaking of the quickline again allows a reaction temperature in the region of 350° C. to be sustained so, if desired, the car's performance and acceleration will be no less than it was in the long range mode. Thereby quick getaways from traffic lights etc. are possible and indeed sports-car performance could be achieved if desired.

I claim:

1. In combination,
   a gas-powered motor;
   means for holding liquified gas;
   means for evaporating said liquified gas;
   conduit means to deliver gas from said evaporating means to said motor to power said motor;
   receiving means for expanded gas from said motor;
   condensing buffer substance means in thermal communication with the expanded gas flowing into said receiving means; and
   refrigeration means to pump heat from and cool said condensing buffer substance means to a temperature low enough to condense said expanded gas.

2. The combination as claimed in claim 1 wherein said holding means comprises a reservoir for the liquified gas and a delivery conduit from said reservoir to said evaporating means.

3. The combination as claimed in claim 1 wherein said receiving means comprises a vessel in communication to receive the exhaust from said motor and containing said condensing buffer, substance means.

4. The combination as claimed in claim 3 wherein said gas receiving vessel is enclosed in thermal insulation.

5. The combination as claimed in claim 1 wherein said condensing buffer substance means comprises an isothermal heat sink capable of absorbing heat from the expanded gas from said motor, to condense the expanded gas.

6. The combination as claimed in claim 5, wherein said condensing buffer substance comprises a substance selected from the group consisting of: a concentrated salt solution; ethylene glycol; a mixture of ethylene glycol and water; ethyl alcohol; a mixture of ethyl alcohol and water; glycerine; a mixture of glycerine and water; solid carbon dioxide.

7. The combination as claimed in claim 6 wherein said condensing buffer substance comprise a solution of 10% to 30% by weight of calcium chloride in water.

8. The combination as claimed in claim 6 wherein said condensing buffer substance is encapsulated in numerous small containers.

9. The combination as claimed in claim 5 wherein said heat sink forms part of the refrigeration equipment of a refrigerated vehicle.

10. The combination as claimed in claim 1 which further comprises a feed pump for drawing liquified gas from said holding means and delivering the liquified gas at higher pressure to said evaporating means.

11. The combination as claimed in claim 1 which further comprises a heat exchange means receiving a flow of liquified gas flowing from said holding means to said evaporating means.

12. The combination as claimed in claim 11 wherein said evaporating means for the liquified gas comprise heat exchange means, to transfer heat energy from ambient surroundings into the liquified gas flowing to said evaporating means.

13. The combination as claimed in claim 1 wherein said evaporating means is in thermal communication with a container holding a buffer substance which, during operation of the motor, releases heat to said evaporating means and to the liquified gas therein, whereby the tendency of the evaporation of the liquified gas to cool the remaining liquified gas in the evaporating means is at least partly counteracted.

14. The combination as claimed in claim 13 wherein said buffer substance is held in a container surrounding said conduit means.

15. The combination as claimed in claim 13 wherein said holding means comprise a reservoir for the liquified gas and said delivery conduit extends from said reservoir to said evaporating means and wherein said buffer substance is held in a container surrounding said delivery conduit.

16. The combination as claimed in claim 13 wherein said buffer substance is a liquid which freezes at a temperature above the temperature of the gas flowing from said evaporating means to said motor.

17. The combination as claimed in claim 16 wherein said buffer substance is a liquid which freezes at a temperature between 0° C. and 100° C.

18. The combination as claimed in claim 1 which further comprises a reaction vessel to supply heat to superheat the gas from said evaporating means before expansion in said motor.

19. The combination as claimed in claim 18 wherein reactive materials are supplied to said reaction vessel and which undergo a physico-chemical reaction producing heat at a temperature greater than 100° C.

20. The combination as claimed in claim 19 wherein said physico-chemical reaction of said reactive materials is reversible by the application of heat and/or reduced pressure.

21. The combination as claimed in claim 19 wherein said reactive materials are selected from the group consisting of: calcium, calcium oxide CaO, lithium oxide $Li_2O$, sodium monoxide $Na_2O$, sodium peroside $Na_2O_2$, potassium monoxide $K_2O$, potassium dioxide $K_2O_2$ peroside $KO_2$, magnesium oxide $M_gO$, calcium peroxide $CaO_2$, calcium tetroxide $CaO_4$, strontium oxide $srO$, strontium peroxide $SrO_2$, barium oxide $BaO$, barium peroxide $BaO_2$, water $H_2O$, sulphuric acid $H_2SO_4$, carbon dioxide $CO_2$ and oxygen $O_2$.

22. The combination as claimed in claim 1 wherein said refrigeration means is driven by said motor.

23. The combination as claimed in claim 1 which said refrigeration means pumps heat from said condensing buffer substance means to said evaporating means to provide heat for evaporation of the liquified gas.

24. The combination as claimed in claim 23 wherein said refrigeration means pumps heat to an intermediate store at a temperature intermediate that of said condensing buffer substance and that of the evaporated gas from said evaporating means.

25. The combination as claimed in claim 24 wherein said refrigeration means includes means having a first working fluid to pump heat from said condensing buffer substance to said intermediate store and means having a second working fluid to pump heat from said intermediate store to said evaporating means.

26. A motor vehicle having at least the combination as claimed in claim 5.

27. A motor vehicle as claimed in claim 26 and having at least one compressor and means arranged to drive said compressor during braking of the vehicle, said compressor being connected in a working fluid circuit to compress the working fluid during vehicle braking and means for extracting energy from the compressed working fluid and for supplying the energy to the gas to be delivered to said motor.

28. A motor vehicle as claimed in claim 27 wherein means are provided for extracting heat energy from said compressed working fluid and for supplying said heat energy to the gas to be delivered to said motor.

29. A motor vehicle as claimed in claim 28 wherein said means for extracting heat energy from said compressed working fluid comprise a condenser in heat exchange with said evaporating means.

30. A motor vehicle as claimed in claim 28 wherein said working fluid is that employed as the liquified and gaseous and expanded gas of claim 36.

31. A motor vehicle as claimed in claim 28 wherein said compressor is connected in a circuit independent from that of said gas-powered motor.

32. A gas-powered motor as claimed in claim 1 and further including a pneumatic power device for operating one or more ancillary services connected through valve means to the gas circuit of said gas-powered motor.

33. A motor vehicle as claimed in claim 27 wherein said means arranged to drive said compressor may be employed during normal operation of the vehicle without retardation of the vehicle.

34. A motor vehicle as claimed in claim 26 wherein said isothermal heat sink is further employed as part of an air-conditioning system.

35. The combination as claimed in claim 20 wherein said reaction vessel is heated by an independent supply of heat energy so as partly or completely to restore said reactive materials to their condition before said physiochemical reaction.

36. A gas-powered motor as claimed in claim 35 wherein said independent supply of heat energy comprises electrical heating means.

* * * * *

UNITED STATES PATENT AND TRADEMARK OFFICE
CERTIFICATE OF CORRECTION

PATENT NO. : 4,449,372
DATED : May 22, 1984
INVENTOR(S) : JOHN WALTER RILETT

It is certified that error appears in the above-identified patent and that said Letters Patent is hereby corrected as shown below:

Column 9, line 36, change "31 $\sqrt{°}$C., 31 38°C." to

-- -29°C., -38°C. --.

Signed and Sealed this

Sixteenth Day of October 1984

[SEAL]

Attest:

GERALD J. MOSSINGHOFF

Attesting Officer

Commissioner of Patents and Trademarks